F. M. KOETZ.
TRACTION WHEEL.
APPLICATION FILED OCT. 25, 1919.
1,352,281.
Patented Sept. 7, 1920.
FIG_1_
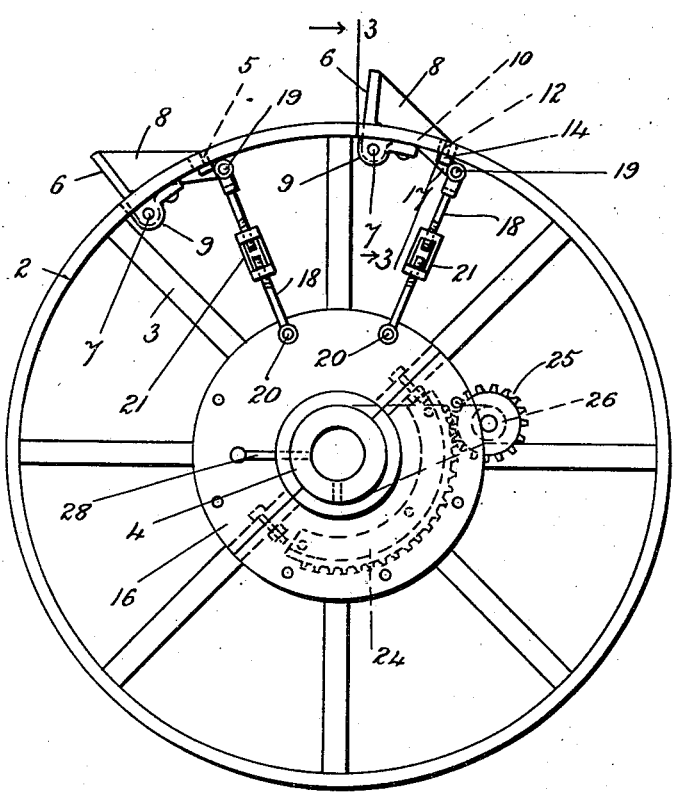
FIG_3_
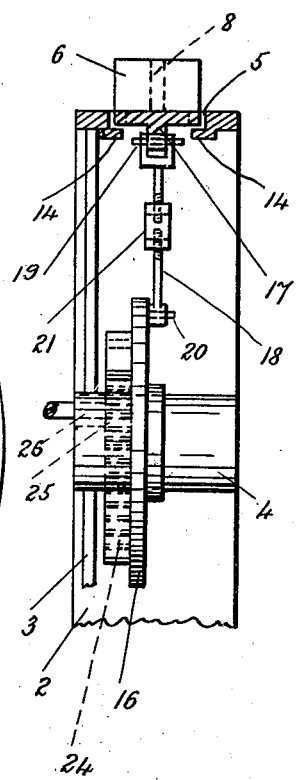
FIG_2_
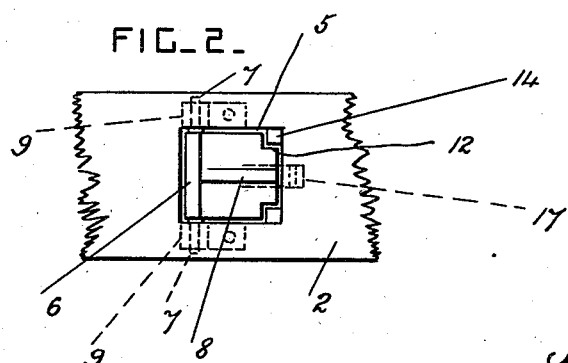
Inventor.
Francis M. Koetz
by Herbert W. Jenner
Attorney.

UNITED STATES PATENT OFFICE.

FRANCIS M. KOETZ, OF WOODSTOCK, ILLINOIS.

TRACTION-WHEEL.

1,352,281.   Specification of Letters Patent.   Patented Sept. 7, 1920.

Application filed October 25, 1919. Serial No. 333,193.

*To all whom it may concern:*

Be it known that I, FRANCIS M. KOETZ, a citizen of the United States, residing at Woodstock, in the county of McHenry, and State of Illinois, have invented certain new and useful Improvements in Traction-Wheels, of which the following is a specification.

This invention relates to the main road wheels of traction engines and tractors; and it consists in the novel construction and combination of the parts hereinafter fully described and claimed whereby the rim of the wheel is provided with adjustable cleats for use in passing over soft ground.

In the drawings, Figure 1 is a side view of a traction wheel provided with adjustable cleats according to this invention. Fig. 2 is a plan view from above of a portion of the wheel rim showing one of the cleats. Fig. 3 is a cross-section through the wheel rim taken on the line 3—3 in Fig. 1 and showing one of the cleats and the means for adjusting it.

The traction wheel is of any approved construction provided with a rim 2, spokes 3, and hub 4. The rim has rectangular holes 5 formed in it at intervals between the spokes. Each hole 5 has an angle-shaped cleat 6 pivoted to the rim by pivots 7 and working in the hole. The cleat is formed of two plates arranged at a right-angle to each other, and having a central stiffening rib 8. The pivots are arranged at the junction or apex of the angle of the plates, and they engage with bearings 9 secured to the rim at one end of the holes. The lower plate 10 has notches 12 in its corners which work over stop lugs 14 on the rim, and the upper plate rests on these stop lugs, substantially flush with the rim, when the cleat is turned down and not in use. As many cleats as desired are provided, but they are not all shown, as they are all alike. When the cleats are pushed out, as shown in the drawings, they prevent the wheel from slipping.

A disk 16 is formed of two halves or sections bolted together, and this disk is mounted to oscillate on the hub 4 of the wheel. The cleats have lugs 17 on the ends of their lower plates 10, and connecting-rods 18 are provided which are pivoted at one end to the lugs 17 by pins 19. The other ends of the connecting-rods are pivoted to the disk 16 by pins 20, and the connecting-rods are made adjustable in length by turnbuckles 21 at their middle parts.

The cleats are raised and lowered by turning the disk about a quarter of a revolution, and 24 is a toothed segment secured to the disk. A toothed pinion 25 gears into this toothed segment, and is secured on a shaft which is journaled in a bearing 26 secured to the hub of the wheel. The pinion is revolved by any approved means, and the disk is secured by means of a pin 28 or any other approved locking device to the hub after its position has been adjusted.

What I claim is:

1. The combination, with a traction wheel having a rim provided with holes, said rim having also bearings and stops on its innerside at the opposite end portions of its holes, of cleats formed of rectangular plates arranged at a right angle to each other and provided with stiffening ribs, said cleats being provided with pivots at their apex portions which engage with the said bearings, the longitudinal plates of the cleats being provided with notches to permit them to be turned inwardly past the stops until the radial plates rest against the stops, said longitudinal plates having also inwardly projecting lugs arranged between their notches, and means pivoted to the said lugs and operating to adjust the positions of the cleats.

2. The combination, with a traction wheel having a rim provided with rectangular holes and having stops on its underside at the corners at one end of the holes, of bearings secured to the underside of the rim at the other end of the holes, cleats formed of rectangular plates arranged at a right angle to each other and provided with stiffening ribs, said cleats being provided with pivots at their apex portions which engage with the said bearings, the longitudinal plates of the cleats being provided with notches at their corners to permit them to be turned inwardly past the stops, the plates of the said cleats being adapted to engage alternately with the said holes and substantially close them, and the radial plates being adapted to engage with the said stops and means for moving the cleats pivotally and locking them to the wheel rim.

In testimony whereof I have affixed my signature.

FRANCIS M. KOETZ.